(12) United States Patent
Karasik et al.

(10) Patent No.: US 6,467,319 B1
(45) Date of Patent: Oct. 22, 2002

(54) REMOTE KEY INTERLOCK SYSTEM

(75) Inventors: Vladimir Karasik, Walled Lake; Joseph Khoury, Farmington; Rajkumar Ramamurthy, Auburn Hills, all of MI (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 09/435,591

(22) Filed: Nov. 8, 1999

(51) Int. Cl.[7] .............................................. B60R 25/02
(52) U.S. Cl. ......................................... 70/186; 70/252
(58) Field of Search ............................ 70/182–186, 252

(56) References Cited

U.S. PATENT DOCUMENTS

| | | | |
|---|---|---|---|
| 2,295,723 A | 9/1942 | Duncan | |
| 5,793,122 A | * 8/1998 | Dingwall et al. | 70/252 |
| 5,848,540 A | 12/1998 | Pieper | |
| 5,860,303 A | * 1/1999 | Proz et al. | 70/252 |
| 5,896,765 A | 4/1999 | Peyre et al. | |
| 5,906,120 A | * 5/1999 | Thacker et al. | 70/186 |

FOREIGN PATENT DOCUMENTS

DE        4446613 A1      6/1996

\* cited by examiner

Primary Examiner—Richard M. Camby
(74) Attorney, Agent, or Firm—Blank Rome LLP

(57) ABSTRACT

A remote key interlock system includes a locking device mounted on a steering column and a key actuated ignition switch located remote from the locking device, where a cable connects the locking device to the key actuated ignition switch. The locking device being engageable with a recess of a steering shaft housed within the steering column. The cable being either electrically insulated from one of the key actuated ignition switch and the locking device, or load bearing, or moveable.

8 Claims, 4 Drawing Sheets

REMOTE KEY INTERLOCK SYSTEM

BACKGROUND OF THE INVENTION

1. Field of the Invention

The present invention relates to locking systems used in automotive applications. The invention more particularly concerns the locking of a steering shaft to a steering column of an automobile so as to prevent rotation of the steering shaft during selected periods of time. The locking feature of the locking system is remotely actuated by a key.

2. Discussion of the Background

For years now, automobile manufacturers have been including, as a standard feature, the feature of an immobilized steering shaft when the ignition key is not inserted into the ignition switch. The immobilized steering shaft prevents the steering wheel from rotating, thus, someone not having the ignition key can not steer the car if the car is hot-wired or if someone attempts to push the car away. The theft deterrent function works so well that people who attempt to take a car without using a key, typically, employ a large screwdriver-type of device inserted into the opening for the ignition key to break, bust open, and remove the ignition device that immobilizes the steering shaft. Thus, in a single act of violence, the person breaking into the vehicle can disable both the ignition function and the steering immobilization function. Once, the person has successfully removed the device, the vehicle can then be easily hot-wired and driven away. Such a device that integrates the two functions is disclosed in U.S. Pat. No. 5,848,540.

Attempts have been made to separate the ignition function and the anti-rotation of the steering wheel function in an attempt to make more complicated the act of automobile theft. The person attempting to steal an automobile will now need to disengage the anti-rotation device and the ignition switch separately, which will consume much more time and make it more likely that the person will be caught in the act. As such, it is presumed that a person inclined to steal the automobile of another person will not do so since the risk is not worth the effort. An example of a device that focuses on one of the functions, the anti-rotation function, is disclosed in U.S. Pat. No. 5,896,765, and European Patent Application No. EP764566A1.

An added benefit of placing the key activated ignition switch in another location, such as the dashboard, is that the steering column area is made less busy for the driver of the vehicle. This is important since, currently, the steering column area is very busy, since it incorporates controls for directional indicators, head lamps, cruise control, windshield wipers, and etc.

Recently, another goal of automobile manufacturers is to make a so-called green car. A green car is environmentally friendly in its use of energy to build, to use and maintain, and to dispose and recycle the car. Like it or not, automobile manufacturers have been heading in this direction due to mandates imposes by the Federal government. The Federal government, through the U.S. Department of Transportation, establishes and enforces a Corporate Average Fuel Economy (CAFE) standard manufacturers of passenger vehicles. The CAFE standard requires that the entire fleet of passenger vehicles produced by a manufacture have, on average, a fuel economy that meets or exceeds the limit set by the standard. Typically, from year to year, the CAFE standard increases, thus requiring that, on average, the fleet of vehicles can travel farther than they could the previous year on a gallon of gasoline. Typical key operated combination ignition/locking devices operate off of the electrical system of the automobile. Such a current draw lowers the fuel efficiency of the automobile. Therefore, there is a need for automobile systems which do not require much or any power from the automobile's engine.

Furthermore, electrically operated ignition/lock devices are unable to un-lock the steering shaft when the battery is dead. Thus, an automobile having a dead battery is not able to be steered. Therefore, there is a need for a locking device which is powered by a source of energy other than electrical energy.

Another goal of industry is to produce automobiles having quality components and sub-systems which are produced at the lowest possible cost.

Thus, there is a need for a high quality, low cost, steering lock device which is remote from the ignition switch and which does not require the use of power from the engine to actuate the locking device portion of the system.

SUMMARY OF THE INVENTION

It is an object of the invention to provide a remote key interlock system that separates the ignition function from the anti-rotation function.

It is a further object of the invention to provide a remote key interlock system which uses a minimum amount of energy from the automobile.

It is another object of the invention to provide a device which is low in cost to produce.

It is still yet another object of the invention to provide a remote key interlock system which deters theft of the automobile.

It is another object of the invention to provide a remote key interlock system which fits within the space currently allocated for a conventional key activated ignition system located on the steering column.

It is still further another object of the invention to provide a remote key interlock system which is highly reliable.

In one form of the invention the remote key interlock system includes a lock device mounted on a steering column, a key actuated ignition switch located remotely from the locking device, and a first cable connecting the key actuated ignition switch to the locking device. The locking device being engageable with a recess of a steering shaft housed within the steering column. The first cable being electrically insulated from one of the key actuated ignition switch and the locking device.

In yet another form of the invention, the remote key interlock system includes a lock device mounted on a steering column, a key actuated ignition switch located remotely from the locking device, and a first cable connecting the key actuated ignition switch to the locking device. The locking device being engageable with a recess of a steering shaft housed within the steering column. The first cable being moveable.

In still yet another form of the invention, the remote key interlock system includes a lock device mounted on a steering column, a key actuated ignition switch located remotely from the locking device, and a first cable connecting the key actuated ignition switch to the locking device. The locking device being engageable with a recess of a steering shaft housed within the steering column. The first cable being load bearing.

In another form of the invention, the device is an automobile having a remote key interlock system. The automobile includes a chassis, an engine attached to the chassis, wheels attached to the chassis and operably connected to the engine, a steering shaft rotatably mounted to the chassis and operably connected to the wheels, a steering column surrounding the steering shaft, and a the remote key interlock system. The remote key interlock system includes a locking device mounted on the steering column, a key actuated ignition switch mounted on the chassis in a location remote from the locking device, and a cable connecting the key actuated ignition switch to the locking device. The locking device being engageable with the recess of the steering shaft. The cable being electrically insulated from at least one of the key actuated ignition switch and the locking device, moveable, and load bearing.

Thus, the invention achieves the objectives set forth above. The invention provides a device which is physically separate from the ignition function and which increases the effort required to steal an automobile equipped with the steering lock device. Additionally, the system requires no energy from the automobile to un-lock and lock the locking device of the remote key interlock system. Furthermore, the system is reliable and is low in cost to produce.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 1:
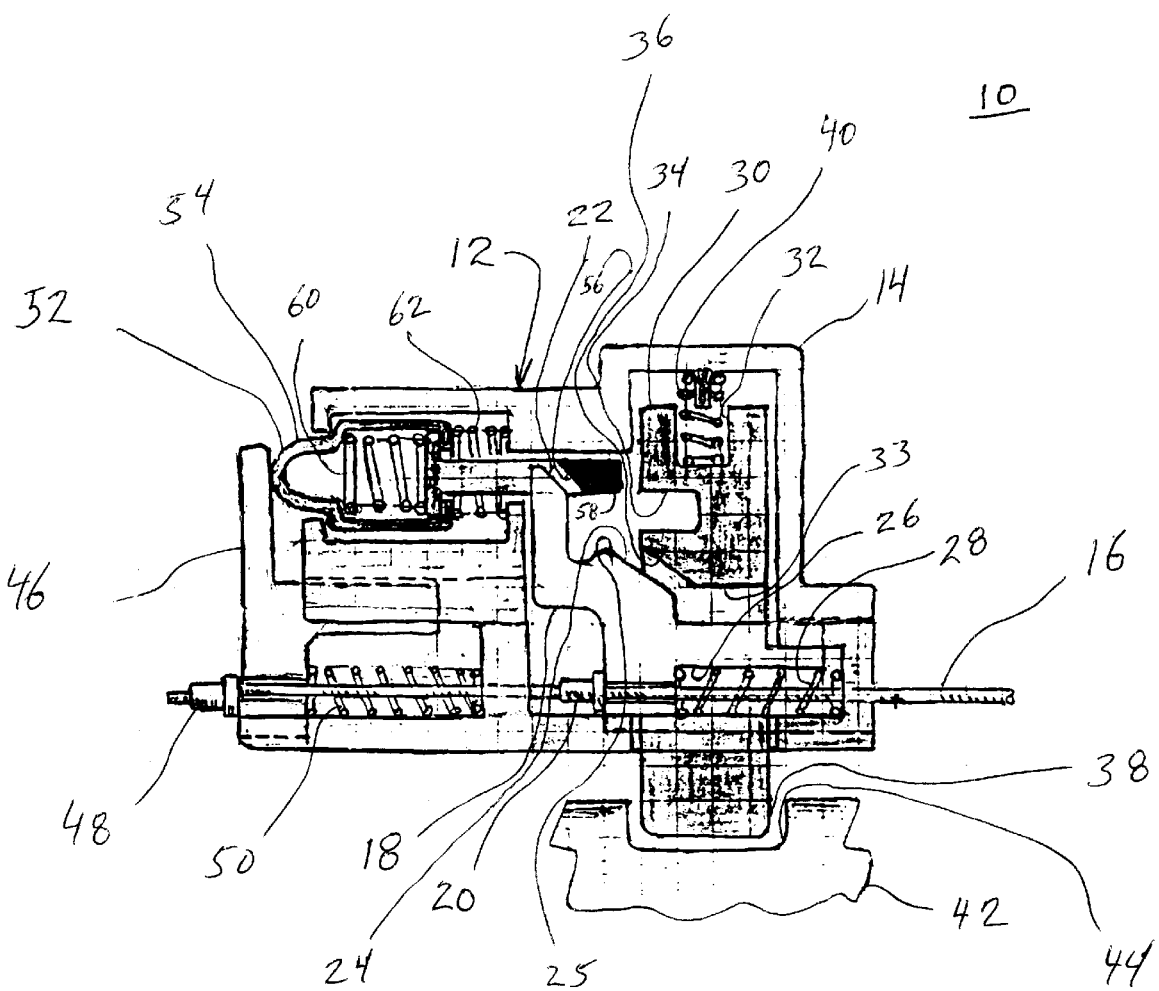
FIG. 1 is a partial, cross-sectional view of a locking device of an embodiment of the remote key interlock system.
Figure 2:
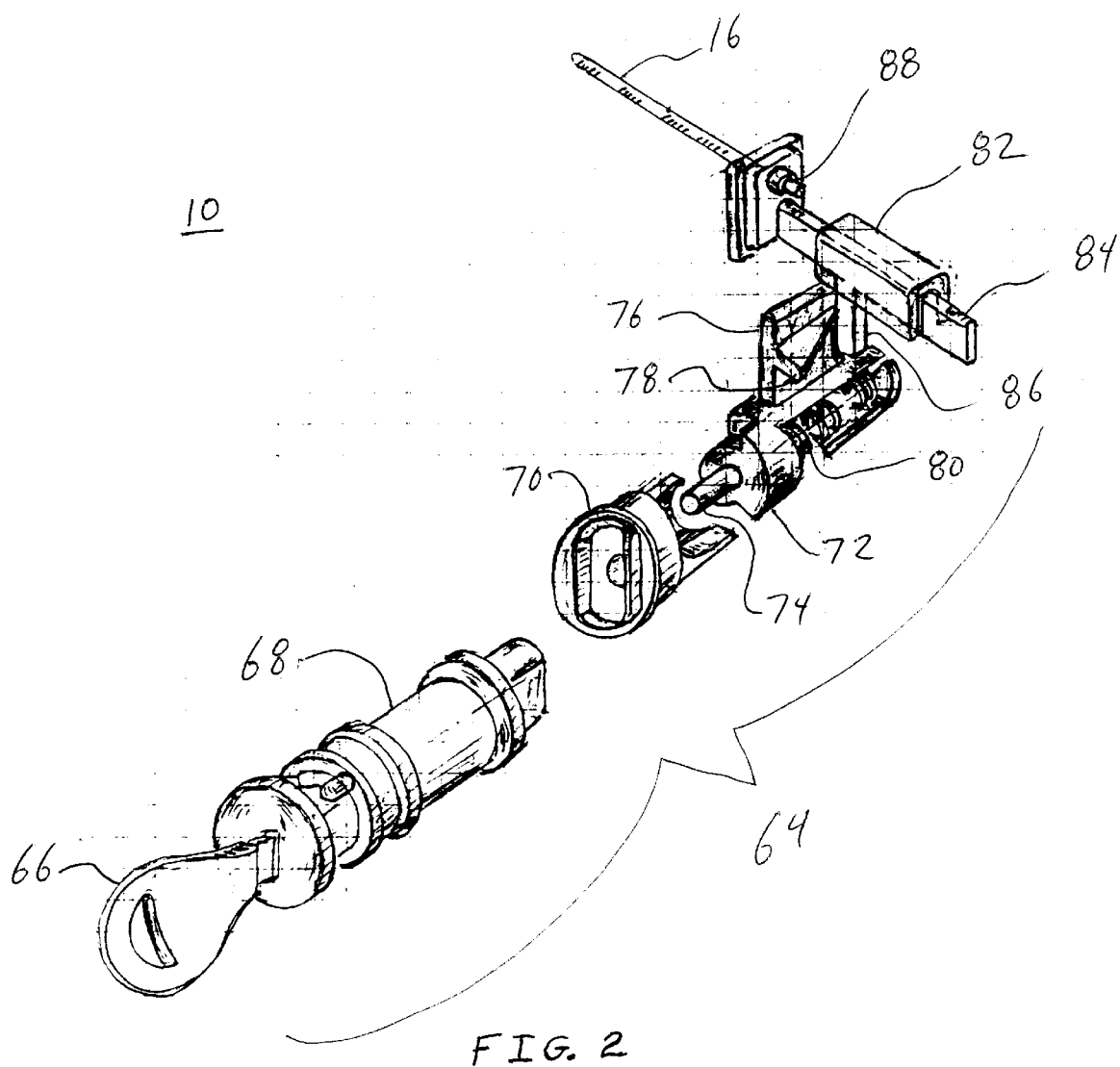
FIG. 2 is a partial, exploded perspective view of a key actuated ignition switch of the remote key interlock system.

Referring now to the drawings, wherein like reference numerals designate identical or corresponding parts throughout the several views, and more particularly to FIGS. 1–5 thereof, an embodiment of the present invention is a remote key interlock system 10 as shown in FIGS. 1 and 2. FIG. 1 is a partial, cross-sectional view of a locking device 12 of the remote key interlock system 10. FIG. 2 is a partial, exploded perspective view of a key actuated ignition switch 64 of the remote key interlock system 10.

The locking device 12, as shown in FIG. 1, includes a housing 14 which is mounted to a steering column of an automobile (not shown). The housing 14 houses the moving parts of the locking device 12. The moving parts include a lock bolt slider 18, a lock bolt 30, a plunger slider 46, and a plunger assembly 52. The lock bolt slider 18 includes a first cam surface 22, a second cam surface 24, a peak 25, and a cavity 26. The locking bolt slider 18 is biased away from the lock bolt 30 by a lock bolt slider spring 28. A cable 16 is connected to the lock bolt slider 18 by way of a first cable stop 20. When a force is transmitted through the first cable stop 20 which overcomes the force generated by the lock bolt slider spring 28, the lock bolt slider 18 moves towards the lock bolt 30.

The lock bolt 30 includes a first recess 34, a second recess 32, a first cam surface 36, a second cam surface 33, and a locking end 38. The locking end 38 is engageable with a recess 44 of a steering shaft 42. The lock bolt 30 is biased towards the recess 44 of the steering shaft 42 by a lock bolt spring 40. The second cam surface 24 of the lock bolt slider 18 is complementary to the first cam surface 36 of the lock bolt 30.

The plunger slider 46 is actuated by a force transmitted by the cable 16 through the second cable stop 48. When a force or load is not transmitted through the cable 16, a plunger slider spring 50 biases the plunger slider 46 away from the lock bolt slider 18.

The plunger assembly 52 includes a contact element 54, an engagement end 58, a first cam surface 56, a first spring 60, and a second spring 62. The first spring 60 biases the contact element 54 away from the engagement end 58, and the second spring 62 biases the contact element 54 away from the engagement end 58. The spring forces generated by the first and second springs 60, 62 can be overcome by a larger force transmitted by the plunger slider 46 into the contact element 54 of the plunger assembly 52.

The key actuated ignition switch 64, shown in FIG. 2, includes a lock cylinder 68 which only accepts the appropriate key 66, a sleeve 70, an actuator slider 84 housed in a lock housing 82. The key actuated ignition switch 64 including the lock housing 82 is mounted to an instrument panel of an automobile (not shown).

The actuator 72 includes a push rod 74, and a tab 76. The tab 76 has a cam surface 78. The actuator slider 84 has a cam surface 78. The actuator slider 84 is connected to the cable 16 through a third cable stop 88. The cable 16 shown in FIGS. 1 and 2 are one and the same. The cam surface 86 of the actuator slider 84 is mateable with the cam surface 78 of the actuator 72. An actuator spring 80 biases the actuator 72 towards the lock cylinder 68. Furthermore, the actuator spring 80 rotationaly biases the actuator 72 away from the actuator slider 84.

The lock cylinder 68 is partially housed within the sleeve 70 and the actuator 72 is partially housed within the sleeve 70. The lock cylinder 68 can translate within the sleeve 70, however, rotation of the lock cylinder 68 causes the sleeve 70 to rotate. Likewise, the sleeve 70 can translate relative to the actuator 72, however, rotation of the sleeve 70 causes the actuator 72 to rotate. The push rod 74 of the actuator 74 extends through a hole in the sleeve 70 so that the push rod 74 can contact the lock cylinder 68.

In operation, the key 66, as shown in FIG. 2, is inserted into the lock cylinder 68. The insertion of the key 66 translates the lock cylinder 68 so that the lock cylinder 68 contacts the push rod 74 of the actuator 72, thus, translating the cam surface 78 of the tab 76 of the actuator 72. As the actuator 72 translates, the inclined cam surface 78 slides against the cam surface 86 of the actuator slider 84 forcing and translating the actuator slider 84 away from the actuator 72. The translating actuator slider 84 the cable 16 to translate towards the key actuated ignition switch 64. While the key 66 is inserted, the translating actuator 72 compresses the actuator spring 80.

The cable 16 shown in FIG. 2 is the same as the cable 16 shown in FIG. 1. Thus, the translating cable 16, shown in FIG. 1, transmits a force through the first cable stop 20 so as to translate the lock bolt slider 18 towards the lock bolt 30. The cable 16 further transmits a force through a second cable stop 48 so as to translate the plunger slider 46 towards the plunger assembly 52. As the lock bolt slider 18 is translated, the lock bolt slider 18 compresses the lock bolt slider spring 28 which is situated within the lock bolt slider cavity 26. Furthermore, as the plunger slider 46 is translated, the plunger slider 46 compresses the plunger slider spring 50.

The translating plunger slider 46 contacts the contact element 54 of the plunger assembly 52, thus causing the plunger assembly 52 to translate towards the lock bolt 30. The translating contact element 54 compresses the second spring 62. If the engagement end 58 of the plunger assembly 52 encounters an obstacle such a non-recessed portion of the lock bolt 30 then the first spring 60 is compressed along with the second spring 62. Typically, the engagement end 58 will only encounter the first recess 34 of the lock bolt 30, however, due to dimensional tolerance stack-ups and dimensional changes due to temperature, the engagement end 58 may contact non-recessed portions of the lock bolt 30.

The second cam surface 24 of the translating lock bolt slider 18 contacts the first cam surface 36 of the lock bolt 30. As the lock bolt slider 18 continues to translate, the second cam surface of the lock bolt slider 24 slides against and transmits a force to the first cam surface 36 of the lock bolt 30. The force causes the lock bolt 30 to translate away from the recess 44 of the steering shaft 42. The translating lock bolt 30 compresses the lock bolt spring 40 situated in the second recess 32.

Figure 3:
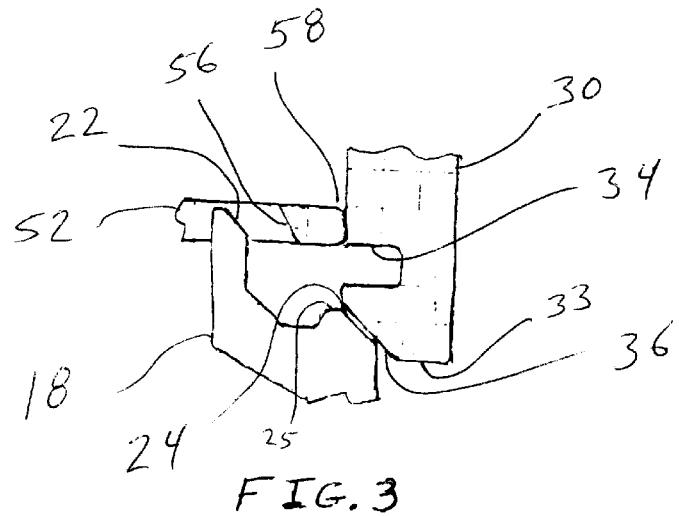
FIG. 3 is a partial, side view of the initial engagement between the plunger assembly, the lock bolt slider, and the lock bolt of the locking device of FIG. 1 of the remote key interlock system when the key is introduced into the key actuated ignition switch.

As the key 66 is fully inserter into the key actuated ignition switch 64, the locking end 38 of the lock bolt 30 is removed from the recess 44 of the steering shaft 42, thus un-locking the steering shaft relative to the steering column. FIG. 3 is an expanded view of the engagement end 58 of the plunger assembly 52, the lock bolt 30, and the lock bolt slider 18 when the key 66 is fully inserted into the key actuated ignition switch 64.

To start the engine, the key 66 must be rotated as far as possible in a clock-wise direction. Such motion, as shown in FIG. 2, tends to rotate the lock cylinder 68, which in turn rotates the sleeve 70, which in turn rotates the actuator 72. The rotated actuator 72 coils the actuator spring 80. The rotated actuator 72 also causes the cam surface 78 of the tab 76 to change its position, which causes the cam surface 78 of the actuator 72 to transmit a force onto the cam surface 86 of the actuator slider 84, thus causing the actuator slider 84 to further translate. The translating actuator slider 84 thus further translates the cable 16 to a start position.

Figure 4:
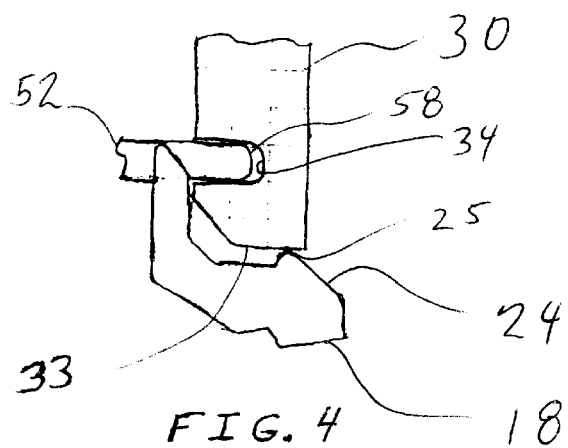
FIG. 4 is a partial, side view of the start position of the components of FIG. 3 when the key is introduced into the key actuated ignition switch and rotated fully to the start position.

The further translated cable 16 causes the components of the locking device 12, shown in FIG. 1, to further translate. FIG. 4 is an expanded view of the engagement end 58 of the plunger assembly 52 fully engaged in the first recess 34 of the lock bolt 30, thus ensuring that the locking end 38 of the lock bolt 30 will not re-enter the recess 44 of the steering shaft 42 while the automobile's engine is started. As shown in FIG. 4, the second cam surface 24 of the lock bolt slider 18 has completely slide against the first cam surface 36 of the lock bolt 30 and the peak 25 of the lock bolt slider is adjacent the second cam surface 33 of the lock bolt 30 so as to also ensure that the locking end 38 of the lock bolt 30 does not re-enter the recess 44 of the steering shaft 42 while the automobile's engine is started.

Figure 5:
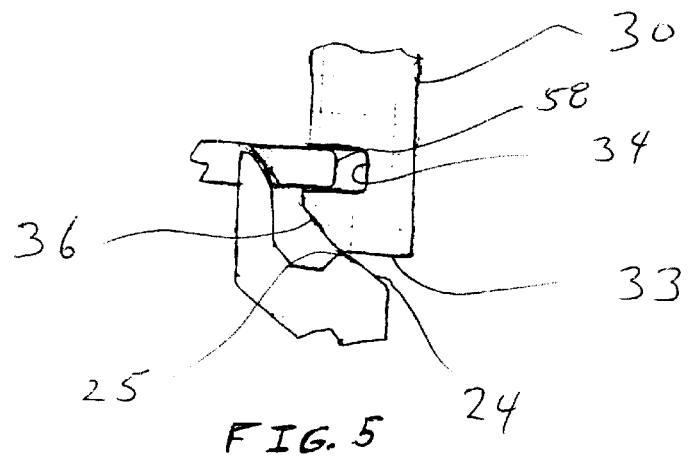
FIG. 5 is a partial, side view of the run position of the components of FIG. 4 when the key is backed-off of the start position and settled into the run position.

When the engine goes from the start condition to the engine run condition, the key 66 is backed-off of the start position by rotating the key 66 a small amount in a counter-clock-wise direction. Consistent with the descriptions above, since the key 66 rotates in a counter-clock-wise a small amount, the actuator 72 also rotates in the counter-clock-wise direction a small amount. Thus, the cam surface 78 of the tab 76 of the actuator 72 moves in a counter-clock-wise direction a small amount, therefore the cam surface 86 of the actuator slider 84 follows the cam surface 78 of the actuator 72. As such, the cable 16 translates a small amount in a direction opposite to that in which it traveled when the key 66 was initially inserted. The actuator slider 84 follows the tab 76 of the actuator 72 since the compressed second plunger assembly spring 62, the plunger slider spring 50, and the lock bolt slider spring 28 all transmit a force through the cable 16 which tends to pull the cable 16 toward the locking device 12. Once the key 66 is at the run position, the locking device 12 components are still engaged to ensure that the locking end 38 does not re-enter the recess 44 of the steering shaft 42 while the automobile's engine is running. FIG. 5 is an expanded view of the lock bolt 30, the plunger assembly 52, and the lock bolt slider 18 when the key is in the run position. As is shown, as compared to FIG. 4, the lock bolt 30 is in the same position, but the lock bolt slider 18 and the plunger assembly 52 translated a small amount in a direction opposite to the direction in which they had previously translated. The components of the remote key interlock system 10 stay in this position until the key 66 has been fully rotated in a counter-clockwise direction to a stop engine running position and has been removed from the key actuated ignition switch 64 or until when the cable 16 is broken into two pieces.

During normal operating conditions, the cable 16 is under tension. However, if the cable 16 breaks into two pieces, the force from the key actuated ignition switch 64 no longer counteracts and balances the force generated by the compressed lock bolt slider spring 28, the plunger slider spring 50, and the second spring 62 of the plunger assembly 52 thus removing the load from the cable 16. Therefore, the unrestrained force generated by the compressed lock bolt slider spring 28 is great enough to overcome any friction and fully translate the lock bolt slider 18 away from the lock bolt 30. Additionally, the unrestrained force generated by the compressed plunger slider spring 50 is great enough to overcome any friction and fully translate the plunger slider 46 away from the plunger assembly 52, and the unrestrained force generated by the compressed second spring 62 of the plunger assembly 52 is great enough to overcame any friction and to fully translate the engagement end 58 of the plunger assembly 52 out of the first recess 34 of the lock bolt 30. Thus, nothing holds the lock bolt 30 back and therefore the force unleashed by the unrestrained compressed lock bolt spring 40 is great enough to overcome any friction and to translate the lock bolt 30 towards the steering shaft 42 so that the locking end 38 contacts the steering shaft 42. Once the steering shaft is rotated far enough in either a clock-wise or counter-clock-wise direction the recess 44 of the steering shaft will line up with the lock bolt 30 so as to allow the engagement end 38 to enter the recess 44 thus locking the steering shaft 42 relative to the steering column.

Under normal conditions, the key 66 is rotated to an off position and the key 66 is removed from the key actuated ignition switch 64. The rotation and removal of the key 66 from the key actuated ignition switch 64 has the same effect as a broken cable, in that the reactive balancing force is removed from one end of the cable 16 and, as such, the components in the locking device 12 return to their arrest or locked positions under the influence of the their associated biasing springs, and the cable 16 translates in a direction opposite to the direction in which it translated when the key 66 was fully inserted into the key actuated ignition switch 64.

Figure 6:
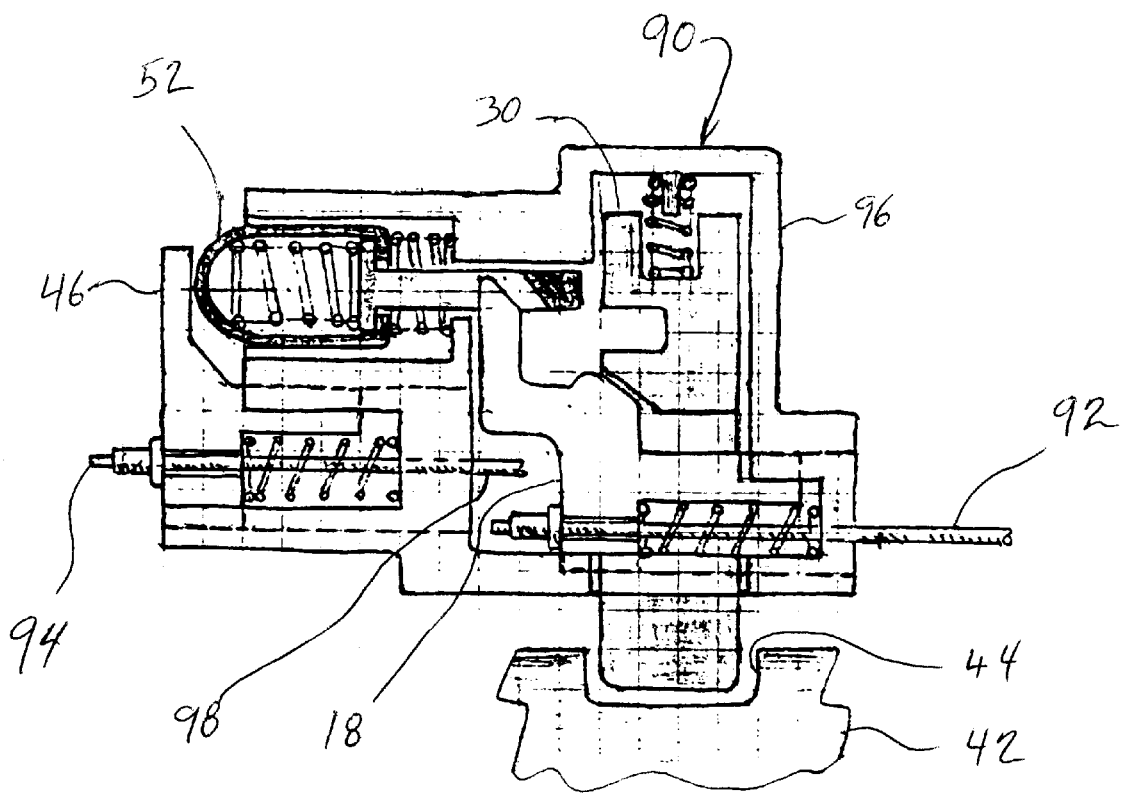
FIG. 6 is a partial, cross-sectional view of a locking device of another embodiment of the remote key interlock system.

A second embodiment of the locking device 90 of the remote key interlock system 10 is shown in FIG. 6. The locking device 90, as shown in FIG. 6, is similar to the locking device 12 shown in FIG. 1. The locking device 90 is engageable with the recess 44 of the steering shaft 42. The locking device 90 includes a lock bolt slider 18, a plunger assembly 52, a plunger slider 46, and a lock bolt 30, which are all the same or similar to the corresponding parts described in regard to the locking device 12 shown in FIG. 1. As compared to locking device 12 of FIG. 1, locking device 90 of FIG. 6 includes a housing 96 which accommodates a first cable 92 connected to the lock bolt slider 18, and a second cable 98 connected to the plunger slider 46. The second cable 98 has its own cable stop 94. The first cable 92 and the second cable 98 branch off of, or split from, a single cable, such as cable 16 shown in FIG. 2, located adjacent to the key actuated ignition switch 64. Thus, the key actuated ignition switch 64, as shown in FIG. 2, can be used with locking device 90 to provide the remote key interlock system 10. The dual cable system is introduced to minimize the possibility of the single cable failure described above.

The operation of the locking device 90 is similar to the operation of the locking device 12. When the cable 16 of the key actuated ignition switch of FIG. 2 is translated, the first cable 92 and the second cable 98 translate accordingly since the first and second cables 92, 98 are attached to the cable 16 (the attachment is not shown) or, alternatively, the first and second cables 92, 98 can be attached directly to the actuator slider 84. The first cable 92 translates the lock bolt slider 18, and the second cable 98 translates the plunger slider 46. Thus, the operation of the locking device 90 is similar, if not identical, to the operation of the locking device 12. The use of the first and second cables 92, 98 provides redundancy to the system. For instance, when the locking device 90 is in an un-locked position, the remote key interlock system 10 will not return to the locked position if either one of the first cable 92 and the first cable 98 breaks. If, in one example, the first cable 92 breaks and the second cable 98 does not break, then the lock bolt slider 18 will translate away from the lock bolt 30 due to the effect of its associated biasing spring, and the plunger assembly 52 will remain engaged in the first recess 34 of the lock bolt 30, thus preventing the lock bolt 30 from engaging the recess 44 of the steering shaft 42. Therefore, the system 10 does not fail when the first cable 92 breaks. If, in another example, the second cable 98 breaks and the first cable 92 does not break, then the plunger slider 46 translates away from the plunger assembly 52 due to the effect of its associated compressed biasing spring. The translated plunger slider 46 thus removes the equilibrium force from the plunger assembly 52 and, as such, the plunger assembly 52 translates away from the first recess 34 of the lock bolt 30 under the influence of its associated compressed biasing springs. However, the lock bolt slider 18 remains engaged with the lock bolt 30 as shown in FIG. 5, thus preventing the lock bolt 30 from engaging the recess 44 of the steering shaft 42. Therefore, the system 10 does not fail when the second cable 98 breaks.

Obviously, numerous modifications and variations of the present invention are possible in light of the above teachings. It is therefore to be understood that within the scope of the appended claims, the invention may be practiced otherwise than as specifically described herein.

What is claimed is:
1. A remote key interlock system comprising:
   a locking device mounted on a steering column, the locking device engageable with a first recess of a steering shaft housed within the steering column;
   a key actuated ignition switch located remotely from the locking device; and
   a first cable connecting the key actuated ignition switch to the locking device, and wherein the first cable is electrically insulated from at least one of the key actuated ignition switch and the locking device; and
   wherein the locking device includes:
      a housing mounted to the steering column;
      a lock bolt slidably mounted in the housing and engageable with the first recess of the steering shaft, the lock bolt having a second recess, and the lock bolt having a first cam surface;
      a plunger slider slideably mounted in the housing;
      a plunger assembly slidably mounted in the housing, the plunger having a first end engageable with the second recess of the lock bolt, the plunger assembly having a second cam surface, and the plunger assembly having a contact end for engagement with the plunger slider; and
      a lock bolt slider slideably mounted in the housing, the lock bolt slider having a third cam surface mateable with the first cam surface of the lock bolt, the lock bolt slider having a fourth cam surface mateable with the second cam surface of the plunger assembly, and wherein the first cable connects to both the plunger slider and the lock bolt slider.

2. The remote key interlock system according to claim 1 wherein the key actuated ignition switch includes:
   an actuator actuateable by a key, the actuator having a fifth cam surface; and
   a slider having a sixth cam sixth cam surface, the slider attached to the first cable.

3. The remote key interlock system according to claim 2 wherein,
   when the key is fully inserted into the key actuated ignition switch, the fifth cam surface of the actuator translates and slides against the sixth cam surface of the slider so as to translate the slider to a first position, the slider translates the first cable in a first direction which causes the third cam surface of the lock bolt slider to slide against the first cam surface of the lock bolt so as to translate the lock bolt out of the first recess of the steering shaft so as to un-lock the steering shaft relative to the steering column so as to be in an un-locked position, and the translation of the first cable in the first direction causes the plunger slider to contact the contact end of the plunger assembly so as to translate the first end of the plunger assembly towards the second recess of the lock bolt, and wherein,
   when the key is rotated to a start position, the actuator rotates in a first rotary direction and the fifth cam surface of the actuator slides against the sixth cam surface of the slider so as to translate the slider to a second position, the second position being greater than the first position, the slider further translates the first cable in the first direction, the first cable translates the lock bolt slider and the plunger slider, the plunger slider translates the plunger assembly, the third cam surface of the lock bolt slider further slides against the first cam surface of the lock bolt so as to further translate the lock bolt, and the first end of the plunger assembly is introduced into the second recess of the lock bolt, and wherein, when the key is rotated to a run position, the actuator rotates in a direction opposite to the first rotary direction, the six cam surface of the of the slider slides against the fifth cam surface of the actuator under the influence of biasing spring force, the slider translates the first cable in a second direction which is opposite to the first direction, spring biasing forces translate the lock bolt slider and the plunger slider, the lock bolt remains stationary.

4. A remote key interlock system comprising:
a locking device mounted on a steering column, the locking device engageable with a first recess of a steering shaft housed within the steering column;
a key actuated ignition switch located remotely from the locking device; and
a cable connecting the key Actuated ignition switch to the locking device, and wherein the cable is moveable; and
wherein the locking device includes:
 a housing mounted to the steering column;
 a lock bolt slidably mounted in the housing and engageable with the first recess of the steering shaft, the lock bolt having a second recess, and the lock bolt having a first cam surface;
 a plunger slider slidably mounted in the housing;
 a plunger assembly slidably mounted in the housing, the plunger having a first end engageable with the second recess of the lock bolt, the plunger assembly having a second cam surface, and the plunger assembly having a contact end for engagement with the plunger slider; and
 a lock bolt slider slideably mounted in the housing, the lock bolt slider having a third cam surface mateable with the first cam surface of the lock bolt, the lock bolt slider having a fourth cam surface mateable with the second cam surface of the plunger assembly, and wherein the cable connects to both the plunger slider and the lock bolt slider.

5. The remote key interlock system according to claim 4 wherein the key actuated ignition switch includes:
an actuator actuateable by the key, the actuator having a fifth cam surface; and
a slider having a sixth cam surface, the slider attached to the cable.

6. A remote key interlock system comprising:
a locking device mounted on a steering column, the locking device engageable with a first recess of a steering shaft housed within the steering column;
a key actuated ignition switch located remotely from the locking device; and
a cable connecting the key actuated ignition switch to the locking device, and wherein the cable is load bearing; and
wherein the locking device includes:
 a housing mounted to the steering column;
 a lock bolt slidably mounted in the housing and engageable with the first recess of the steering shaft, the lock bolt having a second recess, and the lock bolt having a first cam surface;
 a plunger slider slidably mounted in the housing;
 a plunger assembly slidably mounted in the housing, the plunger having a first end engageable with the second recess of the lock bolt, the plunger assembly having a second cam surface, and the plunger assembly having a contact end for engagement with the plunger slider; and
 a lock bolt slider slideably mounted in the housing, the lock bolt slider having a third cam surface mateable with the first cam surface of the lock bolt, the lock bolt slider having a fourth cam surface mateable with the second cam surface of the plunger assembly, and wherein the cable connects to both the plunger slider and the lock bolt slider.

7. The remote key interlock system according to claim 6 wherein the key actuated ignition switch includes:
an actuator actuateable by the key, the actuator having a fifth cam surface; and
a slider having a sixth cam surface, the slider attached to the cable.

8. A automobile comprising:
a chassis;
an engine attached to the chassis;
wheels attached to the chassis, and wherein at least one of the wheels is operably connected to the engine;
a steering shaft rotatably mounted to the chassis, the steering shaft having a first recess, and wherein the steering shaft is operably connected to at least one of the wheels;
a steering column attached to the chassis, the steering column substantially surrounding the steering shaft;
a locking device mounted on the steering column, the locking device engageable with the first recess of the steering shaft;
a key actuated ignition switch mounted on the chassis in a location remote from the locking device; and
a cable connecting the key actuated ignition switch to the locking device, and wherein the cable is electrically insulated from at least one of the key actuated ignition switch and the locking device, and wherein the cable is moveable, and wherein the cable is load bearing; and
wherein the locking device includes:
 a housing mounted to the steering column;
 a lock bolt slidably mounted in the housing and engageable with the first recess of the steering shaft, the lock bolt having a second recess, and the lock bolt having a first cam surface;
 a plunger slider slidably mounted in the housing;
 a plunger assembly slidably mounted in the housing, the plunger having a first end engageable with the second recess of the lock bolt, the plunger assembly having a second cam surface, and the plunger assembly having a contact end for engagement with the plunger slider; and
 a lock bolt slider slideably mounted in the housing, the lock bolt slider having a third cam surface mateable with the first cam surface of the lock bolt, the lock bolt slider having a fourth cam surface mateable with the second cam surface of the plunger assembly, and wherein the cable connects to both the plunger slider and the lock bolt slider.

* * * * *